(No Model.)
J. W. EVENDEN.
CONDENSER FOR ALE AND BEER.
No. 261,694.  Patented July 25, 1882.
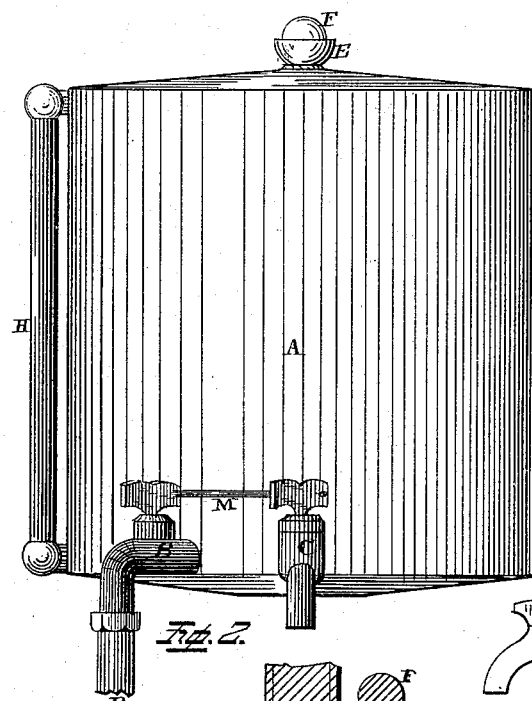
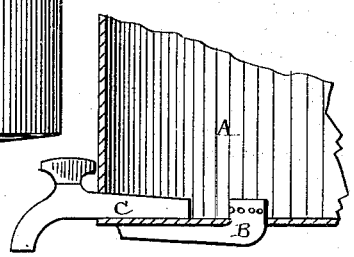
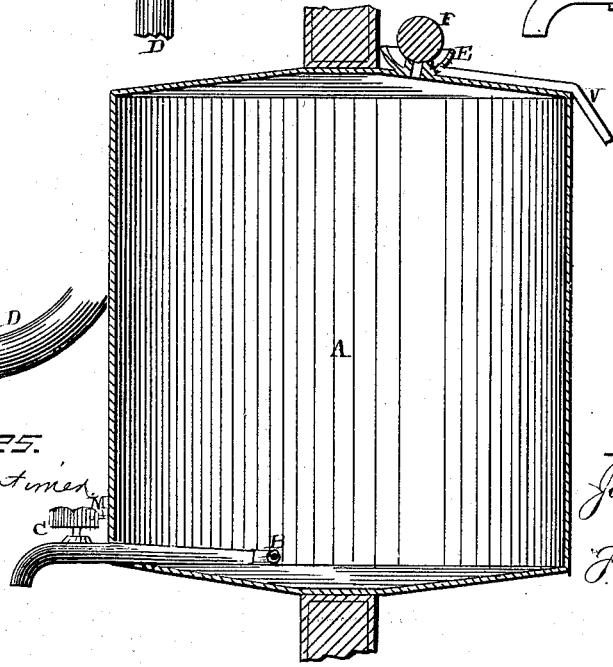
Witnesses:
W. W. Mortimer
W. F. Kim
Inventor:
Jas. W. Evenden
per
J. A. Lehmann,
Atty

UNITED STATES PATENT OFFICE.

JAMES W. EVENDEN, OF ROME, NEW YORK.

CONDENSER FOR ALE AND BEER.

SPECIFICATION forming part of Letters Patent No. 261,694, dated July 25, 1882.

Application filed March 10, 1882. (No model.)

*To all whom it may concern:*

Be it known that I, JAMES W. EVENDEN, of Rome, in the county of Oneida and State of New York, have invented certain new and useful Improvements in Condensers for Ale and Beer; and I do hereby declare the following to be a full, clear, and exact description of the invention, such as will enable others skilled in the art to which it pertains to make and use it, reference being had to the accompanying drawings, which form part of this specification.

My invention relates to an improvement in condensers for ale and beer; and it consists in a vessel into which the ale or beer is drawn from the keg or barrel, in combination with a stop-cock which controls the flow into the vessel and a stop-cock which controls the flow from it, the two cocks being connected together, so that fresh ale or beer is admitted, so as to enliven that which is in the vessel while a quantity is being drawn into a glass, as will be more fully described hereinafter.

The object of my invention is to draw the ale or beer into a separate can or cask, where it is allowed to condense before it is drawn into the tumbler for drinking purposes, so that a solid glass of beer or ale can be drawn, and thus prevent the necessity of having to draw a greater quantity, owing to the amount of froth and foam, than is absolutely necessary.

Figure 1 is a front elevation of my invention. Fig. 2 is a vertical section of the same, shown placed partly in an ice-box. Fig. 3 shows a detail modification.

A represents a suitable vessel of any desired shape, size, or construction, and which is preferably made of any suitable material, so that when placed partially through an ice-box in the summer, as shown in Fig. 2, the ale or beer in the cask will be kept cool. This cask A is provided with a self-acting valve, F, upon its top, of any suitable kind which will allow the gas in the ale or beer to escape and at the same time prevent the access of the outside air to the interior of the can. A ball-valve is here shown; but a spring or weighted valve of any suitable construction will answer equally as well. Around this opening, which is closed by the valve, is made a collar, E, and connected with this collar E is a small drain-pipe, V, for carrying off any ale or beer which may escape from the valve when the cask is full. This cask is also provided with a gage-glass, H, which is connected with the cask at both top and bottom, so as to always indicate the amount of fluid in the cask. The cask is also provided with a stop-cock, B, of any suitable description, which is connected by a pipe, D, with the keg or barrel I, containing the ale or beer, and the amount of ale admitted into the condensing-cask A is controlled by the stop-cock. Placed near the stop-cock B is a second cock, C, through which the ale or beer is drawn into the glass or tumbler. These two stop-cocks may be operated independently of each other; but it will be found preferable to unite their stems together by a connecting-rod, M, and so that when one is turned the other will be operated at the same time. When the two are operated together at the same time that the condensed ale or beer is drawn out into the glass or tumbler to be drank, fresh ale or beer is admitted into the cask A for the purpose of imparting new life to the ale or beer which has already been condensed, and this new ale or beer will cause the ale or beer which is being drawn to have enough life to satisfy the drinker.

The great trouble with ale and beer which is kept on draft for ready use is that it is so full of gas that when drawn into a tumbler or pitcher the greater portion of it is froth or foam, and hence to draw a glass of solid ale or beer a quantity must first be drawn and then set aside until it condenses, in which case a large part of the life of the liquid is lost, or else a much larger quantity than is necessary must be drawn. The object of this invention is to overcome this trouble and to draw the ale or beer into a condensing-cask, where it will condense without being brought in contact with the atmosphere, and from which cask it can be drawn in a solid form without having lost any of its life. By means of my invention ale and beer can be kept on ready draft and each customer given the exact amount he pays for without any loss to the dealer or dissatisfaction to the purchaser.

Instead of having the end of the cock B extend through the side of the vessel A, as shown in Fig. 2, it may preferably be made to extend up through the bottom of the cask, as shown in Fig. 3, and have a large number of small perforations made through its sides. By this construction the live beer is distributed over the bottom of the vessel and more evenly mixed with the beer already in the vessel.

I am aware that two cocks, one placed directly over the other and so constructed as to be opened and closed together, is not new, and this I disclaim.

Having thus described my invention, I claim—

In combination, the vessel A, the inlet-cock B, outlet-cock C, and a rod, M, for connecting the two together, whereby fresh ale or beer is admitted into the vessel as often as the cock C is turned, substantially as shown.

In testimony whereof I affix my signature in presence of two witnesses.

JAMES W. EVENDEN.

Witnesses:
GEORGE H. ABEEL,
LEVENTO E. SEYMOUR.